J. C. WELLER.
Coffee-Pot.
No. 201,139. Patented March 12, 1878.
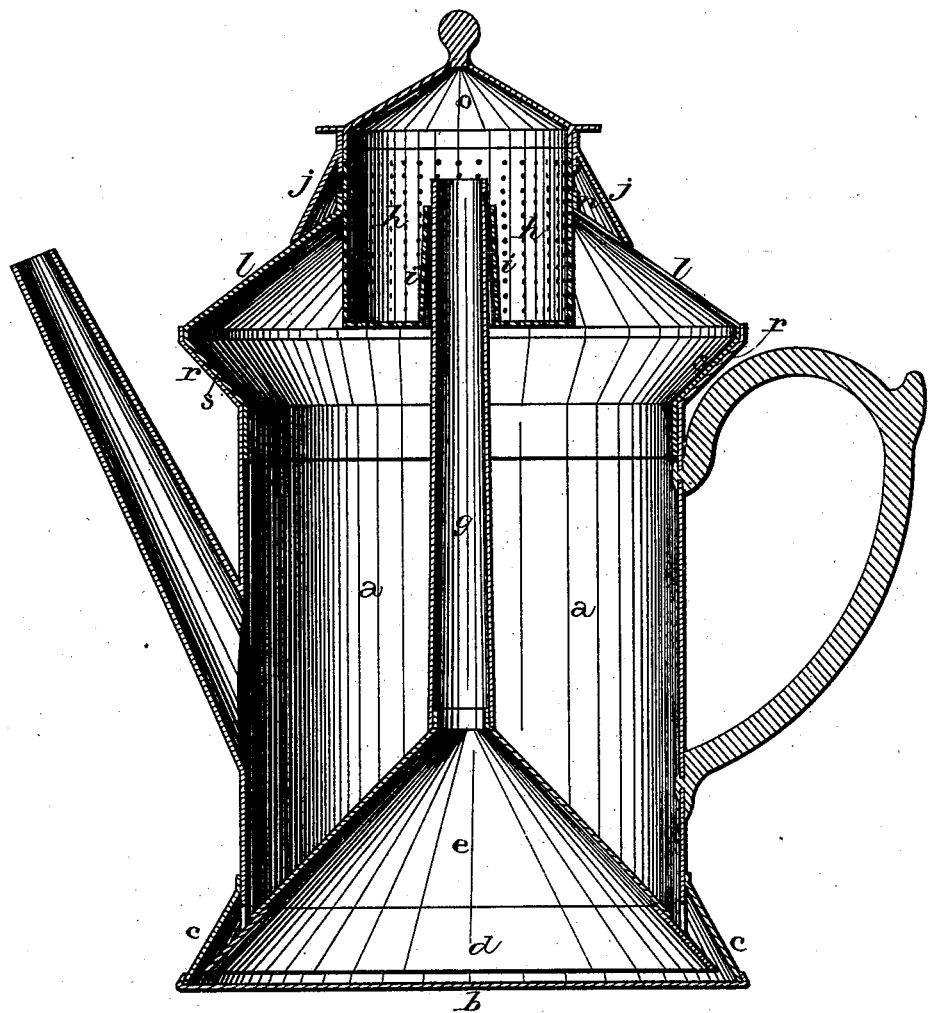
WITNESSES.
J. V. Garner
Will H. Kerr
INVENTOR.
J. C. Weller,
per
J. A. Lehmann,
Atty.

UNITED STATES PATENT OFFICE.

JOHN C. WELLER, OF VALPARAISO, INDIANA.

IMPROVEMENT IN COFFEE-POTS.

Specification forming part of Letters Patent No. 201,139, dated March 12, 1878; application filed February 6, 1878.

*To all whom it may concern:*

Be it known that I, JOHN C. WELLER, of Valparaiso, in the county of Porter and State of Indiana, have invented certain new and useful Improvements in Coffee-Pots; and I do hereby declare the following to be a full, clear, and exact description of the invention, such as will enable others skilled in the art to which it pertains to make and use it, reference being had to the accompanying drawing, which forms part of this specification.

My invention relates to an improvement in coffee-pots.

It consists in enlarging the bottom, and attaching a perforated cone in this enlarged portion, whereby an enlarged heating-surface is given to the pot, and the water can be forced upward in a steady even stream through the coffee, which is placed in a strainer in the top of the cover, as will be more fully described hereinafter.

The drawing represents a vertical section of my invention.

*a* represents a coffee-pot, which is enlarged all around at its lower edge, and provided, preferably, with a copper bottom, *b*, for the purpose of preventing rust, and to enable the pot to stand greater heat without injury. Secured in this enlarged space *c* around the bottom and extending a suitable distance above it, is the cone *d*.

The water passes freely through the small perforations between the cone and the sides of the pot, down under the lower edge of the cone, which is raised slightly above the bottom, and then inward toward the center of the pot, where it rises vertically in a cone, *e*, and up through the pipe *g*. This cone *e* and pipe *g* rest upon the top of the cone *d*, and are readily removable.

The upper end of the pipe *g* projects considerably above the top edge of the coffee-pot proper, into the strainer *h*, in which the ground coffee is placed. This strainer has a pipe, *i*, made of perforated metal, and forming a part of the strainer, which projects a suitable distance above the bottom, so that none of the ground coffee placed in the strainer can be washed or in any manner spilled down into the pot below.

Secured to the upper edge of this strainer is the conical flange *j*, which projects downward and rests upon the top of the cover *l*. Through the top of this cover *l* is formed an opening sufficiently large to allow the lower end of the strainer to pass through, and which has a flange, *n*, projecting upward all around it.

The openings through this cover and in the top of the strainer are of just about the same size, so that the cover *o*, which covers the strainer while the coffee is being made, can also be made to cover this opening in the cover proper when the strainer is removed.

The upper edge of the coffee-pot is flared outward at *r*, and the cover *l* has its flange *s* first bent inwardly, as shown, so as to conform to this flare, and then extends vertically downward, so as to fit the straight portion of the pot.

By thus making a double surface, a much tighter joint is made than where the flange descends straight downward alone, and thus all aroma in the coffee is prevented from escaping.

After the coffee has been made, if so desired, the cone *e* and pipe *g* and the strainer may be removed, and the cover of the strainer used to cover the opening through the center of the cover *l*.

By means of the enlarged bottom, as here shown, a greater heating-surface is presented to the fire, and consequently the water will be heated more rapidly, and a greater quantity of steam generated, which will insure a constant and even flow of water up through the pipe *g*, over the coffee placed in the strainer.

By using a copper bottom, as here shown, all rusting around the lower edge of the pot is prevented, and the pot can be exposed to a much greater heat without injury.

By making an opening through the cover *l* and placing the strainer therein, it can be readily removed after the coffee has been made, for the purpose of being cleaned, and more readily managed.

Having thus described my invention, I claim—

1. The coffee-pot having the enlarged portion *c*, cone *d*, secured rigidly therein, removable cone *e*, pipe *g*, and a strainer surrounding the top of the pipe, substantially as specified.

2. The strainer $h$, provided with the conical flange $j$, which projects downward and rests upon the top of the cover $l$, substantially as described.

3. A coffee-pot having its upper edge flared outwardly, in combination with the cover $l$, having its flange formed substantially as set forth.

In testimony that I claim the foregoing I have hereunto set my hand.

JOHN C. WELLER.

Witnesses:
 JOHN A. WRIGHT,
 JOS. EICH.